Jan. 1, 1929.
D. C. TURNBULL
1,697,333
HOLDBACK
Filed Dec. 6, 1926
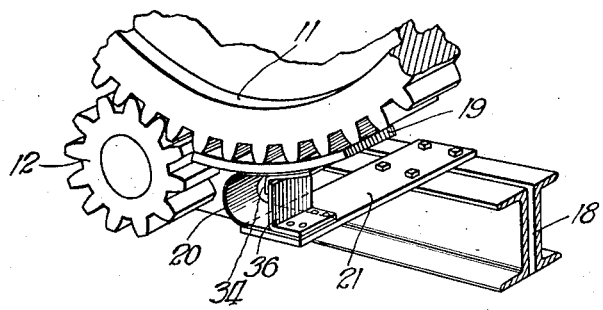
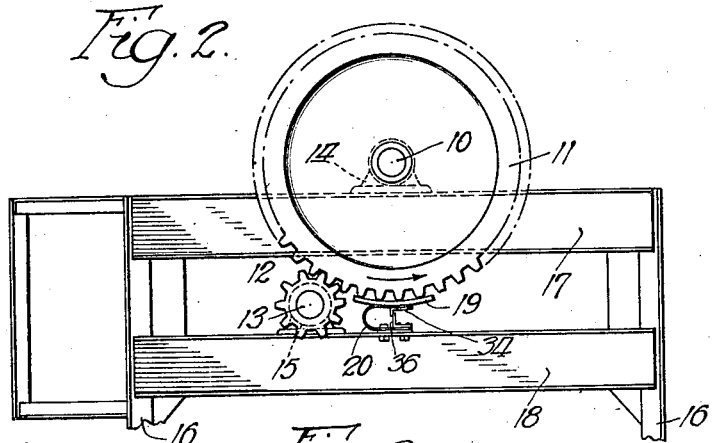
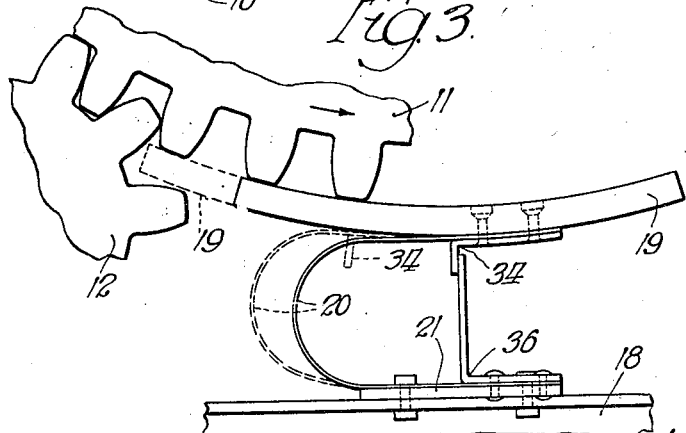
Inventor
David C. Turnbull Patented Jan. 1, 1929.

1,697,333

UNITED STATES PATENT OFFICE.

DAVID C. TURNBULL, OF MISHAWAKA, INDIANA, ASSIGNOR TO DODGE MANUFACTURING CORPORATION, A CORPORATION OF DELAWARE.

HOLDBACK.

Application filed December 6, 1926. Serial No. 152,986.

My invention relates to power transmission, and more specifically to an improved means for preventing reverse movement of power transmissions forming parts of devices which must not be allowed to move backwards, such, for instance, as bucket elevators, where unloading of the full buckets by retrograde movement would be apt to choke the elevator boot and cause breakage of some part of the elevator when an attempt is subsequently made to start it again.

The object of the invention involves an improvement in hold-backs, as such means are commonly called.

In the accompanying drawings,

Figure 1 is a perspective of a hold-back;

Figure 2 is an end elevation of a power transmission, indicating the application of a device according to the invention thereto; and Figure 3 is a fragmentary side elevation of the locking device proper.

According to the invention, means are provided whereby the elements that transmit the load during forward movement are themselves made use of to provide as much as possible of the locking or hold-back means. In the case of rotary members having rolling contact with each other, the interposition of a wedging means between the members themselves may be effective to prevent return movement without carrying heavy mechanical loads for any appreciable distance, through structures other than those already provided for the transmission. Where the rotary members are provided with intermeshing gear teeth the same principle may still be employed.

In the embodiment of the invention selected for illustration, I have indicated one application of the invention to a power transmission of the type commonly used for driving bucket elevators. The chain of buckets (not shown) may be driven by a sprocket or pulley (not shown) mounted on the shaft 10, which shaft is driven by a large gear 11 keyed thereon. The gear 11 meshes with the drive pinion 12 carried by the drive shaft 13, which may be driven by any suitable source of power (not shown). The shafts 10 and 13 are provided with suitable bearings indicated at 14 and 15, which bearings are supported on a suitable structural frame including vertical beams 16, cross-beams 17 for supporting the bearings 14, and cross-beams 18 for supporting the bearings 15.

The hold-back illustrated comprises a locking element acting under compression load directly between the teeth of the gears 11 and 12 as a wedging means. The locking element shown is a simple dog in the form of an arcuate plate 19, not unlike an ordinary brake shoe. This dog is curved to fit the outer ends of the teeth of the large gear, and rides in gentle frictional contact therewith, with one end just clearing the teeth of the pinion as they move out of mesh with the gear teeth.

The dog is resiliently supported by a U-shaped leaf spring 20 having its upper leg riveted to the under side of the dog and its lower leg riveted to a supporting plate 21. The tension of the spring 20 is such that it holds the dog in light frictional contact with the teeth of the large gear. The spring permits the frictional force to move the dog back and forth with the teeth.

During forward movement of the mechanism, which, in this instance, involves clockwise rotation of the pinion and counterclockwise rotation of the gear, the frictional engagement between the gear teeth and the dog will draw the dog out of the path of the teeth on the pinion. The cessation of this movement will leave the dog never any farther to the right than the position shown in Figure 3, and usually somewhat to the left of that position, interfering slightly with the teeth of the pinion.

Any retrograde movement of the parts carries the end of the dog in between the teeth of the gear and pinion where it will be pinched between the ends of the teeth and lock the parts by wedging action against further return movement. If the spring exerts a slight thrust tending to move the dog toward the teeth of the pinion, the locking action may be a little quicker.

Upon starting up again, the teeth of the pinion immediately kick the dog back out of the way.

It is desirable to employ positive stop means limiting the movement of the dog away from the pinion. I have illustrated a short angle clip 34 which also functions as a clamping strip for the upper leg of the spring, and a longer angle clip 36 which also functions as a clamping strip for the lower leg of the spring. The tips of these clips move into abutment to limit the displacement of the shoe toward the right, as seen in Figure 2.

Obviously, the present invention is not restricted to the particular embodiment thereof herein shown and described. Moreover, it is not indispensable that all the features of the invention be used conjointly since they may be employed advantageously in various combinations and sub-combinations.

What I claim is:

1. A device of the character described comprising, in combination, a train of gears; and a spring-actuated member having a normal tendency to move between two intermeshing gears of said train, to lock said gears against rotation; said spring-actuated member riding over the periphery of one of the two gears aforesaid and in contact with the ends of a plurality of the teeth of the gear so as to be moved to a certain extent by the friction of said contact against the resistance of the spring.

2. A device of the character described comprising, in combination, a support; a pair of meshed gears carried by the support; a member in frictional contact with a portion of the periphery of one of the gears and having its end close to the intersection of the addendum circles of the two gears; and means for maintaining said member in frictional contact as aforesaid.

3. A device of the character described comprising, in combination, a spur gear; a driving pinion; and means operated by frictional contact with the periphery of the spur gear to move into and out of contact with the gear and pinion at the point of meshing to lock and unlock the gears according to the direction of rotation thereof.

4. A device of the character described comprising, in combination, a pair of meshing gears; a metallic plate curved to fit the periphery of one of the gears and in contact therewith and having one end located near the point of meshing of said gears; and a spring securing the curved plate to a support and permitting movement of said plate induced by frictional contact with the gear to lock the gears when they start to rotate in one direction.

5. A device of the character described comprising, in combination, a pair of meshing gears; a metallic plate in frictional contact with one of the gears and movable to a limited extent in an arcuate path in either direction according to the direction of rotation of the gear with which it contacts; and a bent spring pressing the plate against said gear.

6. A device of the character described comprising, in combination, a pair of meshing gears; a metallic plate in frictional contact with one of the gears; and an initially straight resilient member bent into a U and attached at one end to the plate and at the other end to a support so as to press the plate against the periphery of said gear; the end of the plate being adjacent the meshing point of the gears so that upon rotation of the gears in one direction, the frictional contact causes the plate to move between the gears and stop them.

7. The combination with a power transmission having gears and a supporting frame for said gears; of a reverse motion lock comprising a spring mounted on said frame, and a dog carried by said spring; said dog lying in contact with the teeth of one of said gears where they move out of mesh, and being movable between said gears by an initial return movement to block said gears against further retrograde movement.

8. The combination with a power transmission having a rotary element and a supporting frame for said element; of means having a wedging action against said element to prevent retrograde movement thereof; and a spring supporting said wedging means on said frame; said spring permitting said wedging means to yield and allow said rotary element to move forwardly in light frictional contact with said wedging means.

9. The combination with a power transmission having a rotary element and a supporting frame for said element; of means having a wedging action against said element to prevent retrograde movement thereof; a spring supporting said wedging means on said frame; said spring permitting said wedging means to yield and allow said rotary element to move forwardly in light frictional contact with said wedging means; and a positive stop limiting the movement of said wedging means out of wedging position.

10. A device of the character described comprising, in combination, intermeshing gears; and means operated by frictional contact with one of said gears to move into and out of contact with said gears at the point of meshing to lock and unlock said gears according to the direction of rotation thereof.

11. A device of the character described comprising, in combination, intermeshing gears; an element in frictional contact with one of said gears to move into and out of contact with said gears at the point of meshing to lock and unlock said gears according to the direction of rotation thereof; and a resilient support for said element tending to hold it near locking position.

12. A hold-back comprising a dog, and a leaf spring resiliently supporting the same to permit bodily movement of translation thereof.

In testimony whereof, I have signed my name to this specification.

DAVID C. TURNBULL.